(12) United States Patent
Bhatia et al.

(10) Patent No.: US 6,820,812 B2
(45) Date of Patent: Nov. 23, 2004

(54) BATTERY INTEGRATED INTO A MOBILE DEVICE

(75) Inventors: Sudhir Bhatia, Brooklyn, NY (US); Alistair Hamilton, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/287,855

(22) Filed: Nov. 4, 2002

(65) Prior Publication Data

US 2004/0084534 A1 May 6, 2004

(51) Int. Cl.$^7$ .................................................. G06K 7/10
(52) U.S. Cl. .......................... 235/472.01; 29/623.1; 29/730
(58) Field of Search ..................... 235/472.01, 462.45, 235/462.46, 472.02; 29/623.1, 730, 623.2, 623; 429/94–96, 210

(56) References Cited

U.S. PATENT DOCUMENTS

| | | | | |
|---|---|---|---|---|
| 5,468,948 A | * | 11/1995 | Koenck et al. | 235/472.01 |
| 5,518,836 A | * | 5/1996 | McCullough | 429/94 |
| 5,642,561 A | * | 7/1997 | Tuttle et al. | 29/623.2 |
| 5,736,726 A | * | 4/1998 | VanHorn et al. | 235/472.02 |
| 5,747,785 A | * | 5/1998 | Miller et al. | 235/472.01 |
| 5,811,773 A | * | 9/1998 | Bard et al. | 235/454 |
| 5,888,666 A | * | 3/1999 | Kawakami | 429/62 |
| 5,972,531 A | * | 10/1999 | Kawakami | 429/49 |
| 6,134,773 A | * | 10/2000 | Kejha | 29/623.3 |
| 6,158,661 A | * | 12/2000 | Chadima et al. | 235/472.01 |
| 6,355,369 B1 | * | 3/2002 | Iarochenko et al. | 429/27 |
| 6,543,695 B1 | * | 4/2003 | Hamilton et al. | 235/462.43 |
| 2003/0039883 A1 | * | 2/2003 | Notten et al. | 429/176 |

* cited by examiner

*Primary Examiner*—Thien M. Le
*Assistant Examiner*—Edwyn Labaze
(74) *Attorney, Agent, or Firm*—Fay Kaplun & Marcin, LLP (57) ABSTRACT

Described is a battery holding portion integrated into a mobile device and a method for its manufacturing. In particular, the battery holding portion may include a battery having an anode and/or a cathode formed in a shape corresponding to a shape of an outer surface of the battery holding portion and a connector connecting the battery to the circuitry of the mobile unit. In addition, the battery holding portion may include a protective material coating a portion of the anode and/or the cathode and a covering material coating the protective material to form an outer surface of the battery holding portion.

20 Claims, 8 Drawing Sheets

PRIOR ART

BATTERY INTEGRATED INTO A MOBILE DEVICE

BACKGROUND INFORMATION

Figure 1:
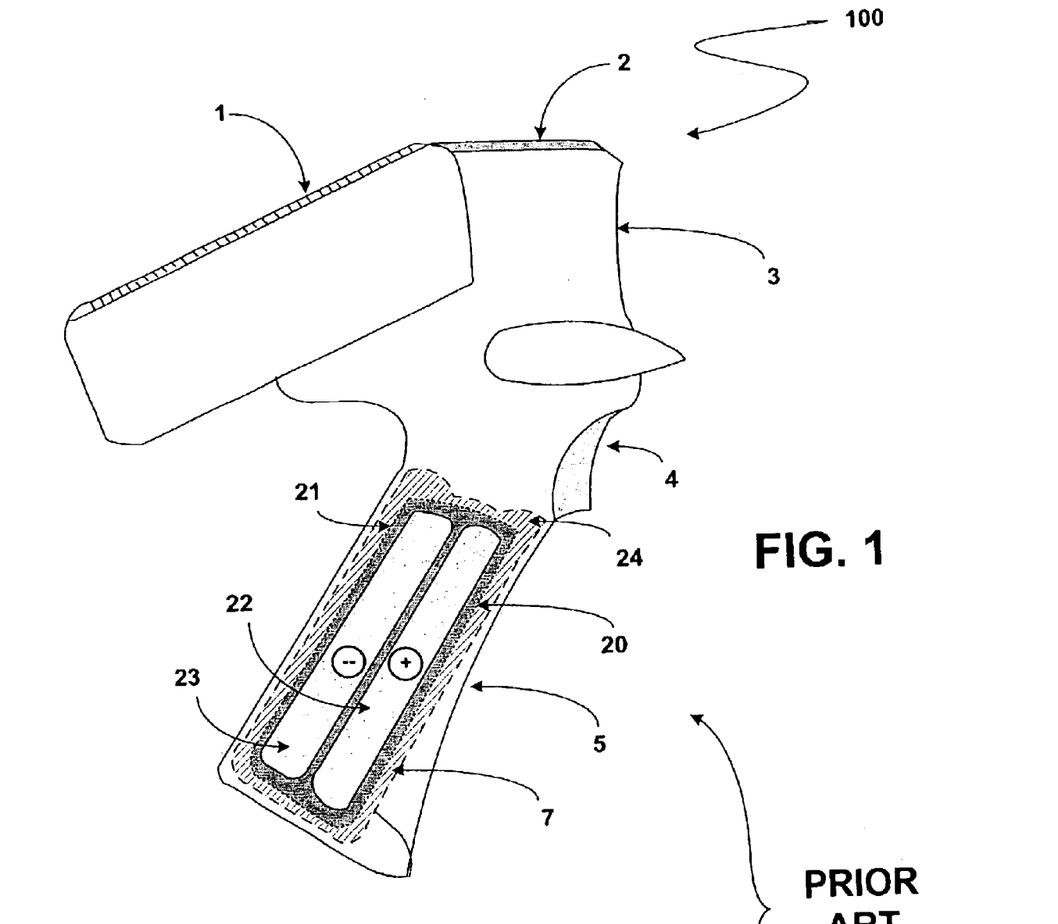
FIG. 1 shows a conventional scanning unit.

A conventional mobile scanner unit 100 is shown in FIG. 1 with an optical arrangement 3 that reads bar codes from labels located on any type of goods(e.g., shipment packages, consumer products, etc.). The unit 100 converts the bar codes into data and displays this data on a display screen 2. A user may manipulate the data, e.g., changing the pricing information or adjusting an inventory value using a keypad 1 and/or a trigger 4.

Figure 2:
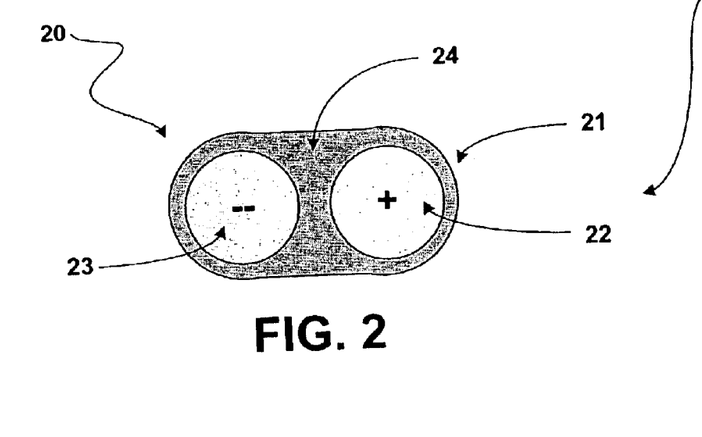
FIG. 2 shows a conventional battery used in the scanning unit illustrated in FIG. 1.

The unit 100 may be powered by a removable battery 20 enclosed within a handle 5 of the unit 100. FIG. 2 shows a cross-sectional view of the battery 20 consisting of, for example, two cells 22 and 23 enclosed within a casing 21.

One limitation of the conventional design of the unit 100, as well as other mobile devices powered using a battery of the type shown, is the existence of dead space in an area storing the battery 20 and within the battery 20 itself. For example, dead space 24 is shown between the cells 22 and 23 and dead space 7 exists between the cells 22, 23 and the casing 21. This dead space may occupy, for example, approximately 20–30% of the total volume.

SUMMARY OF THE INVENTION

The present invention relates to a battery holding portion integrated into a mobile device and a method for its manufacturing. In particular, the battery holding portion may include a battery having an anode and/or a cathode formed in a shape corresponding to a shape of an outer surface of the battery holding portion and a connector connecting the battery to the circuitry of the mobile unit to supply power to circuitry of the mobile unit. In addition, the battery holding portion may include a protective material coating a portion of the anode and/or the cathode and a covering material coating the protective material to form an outer surface of the battery holding portion.

The battery may be manufactured by forming an anode and/or a cathode in a shape substantially conforming to an outer shape of a storage portion of the mobile unit within which the battery is to be stored. Then, a first connector is coupled to the battery for connecting the battery to circuitry of the mobile unit. The anode and/or the cathode is coated with a protective material to create a pack. Subsequently, the battery pack is suspended in a mold having a shape substantially corresponding to the anode and/or the cathode and a liquid covering material (e.g., plastic or metal) is injected into the mold to cover the battery. Then, the covering material is cooled off to form an outer surface of the storage portion of the mobile unit, while preventing the covering material and the protective material from covering the first connector.

BRIEF DESCRIPTION OF DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

The present invention may be further understood with reference to the following description of preferred exemplary embodiments and the related appended drawings, wherein like elements are provided with the same reference numerals. It should be understood that, although the preferred embodiment of the present invention will be described with reference to a handheld bar code scanner, the present invention may be implemented on any mobile device requiring a battery, and the term device will be used throughout this description to generically refer to all such devices.

Figure 3:
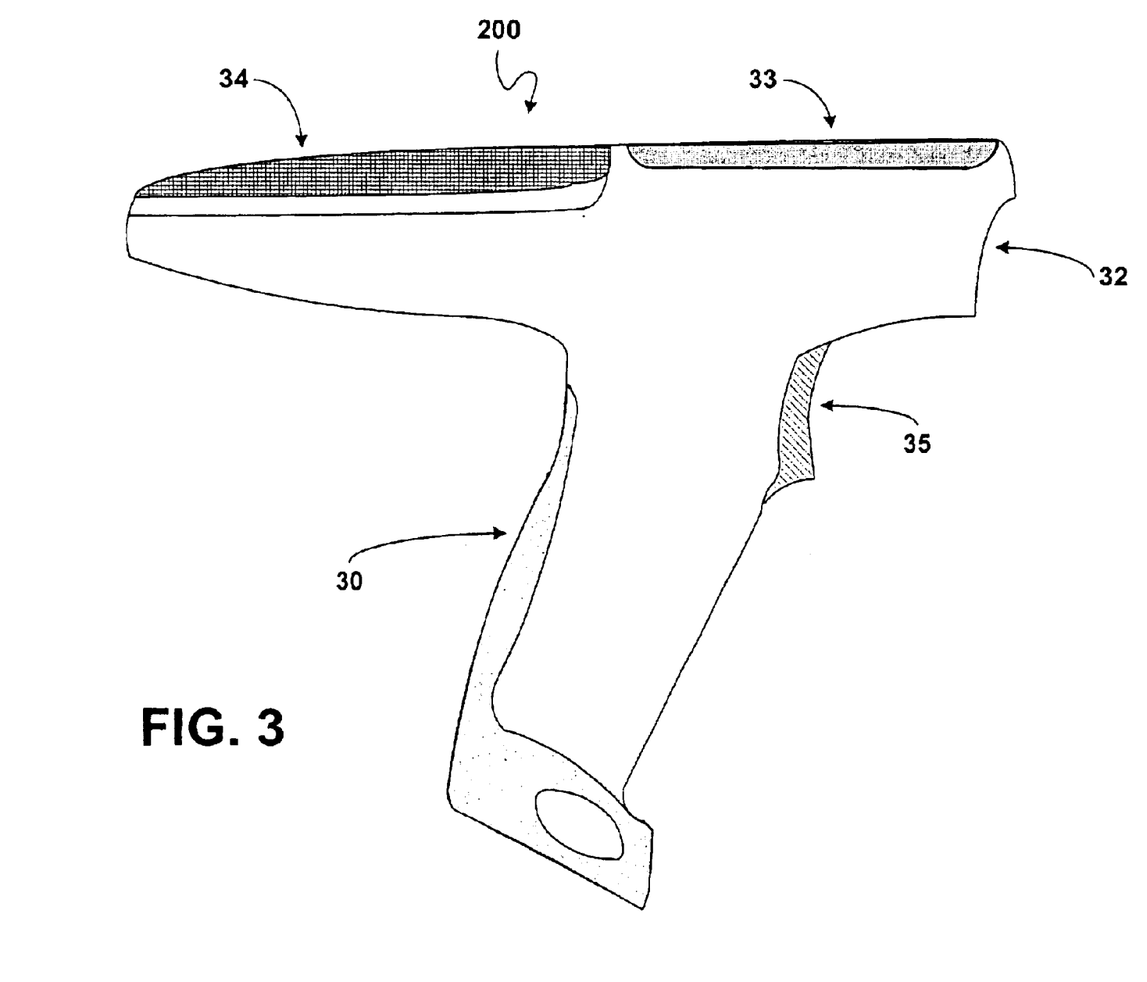
FIG. 3 shows an exemplary embodiment of a mobile device with an integrated battery according to the present invention.

FIG. 3 shows an exemplary embodiment of a mobile device (e.g., a handheld scanner unit 200) according to the present invention. The unit 200 includes an optical arrangement 32 that reads data from a bar code. The data may be displayed, for example, on a flat panel screen 33 and the acquired data may be manipulated by a user via a keypad 34 or a trigger 35. The unit 200 also includes an ergonomically designed handle 30. The unit 200 may communicate with a computer/server via a conventional connection (e.g., a serial connection, USB, IEEE 1394, a wireless connection, etc.) (not shown).

Figure 4:
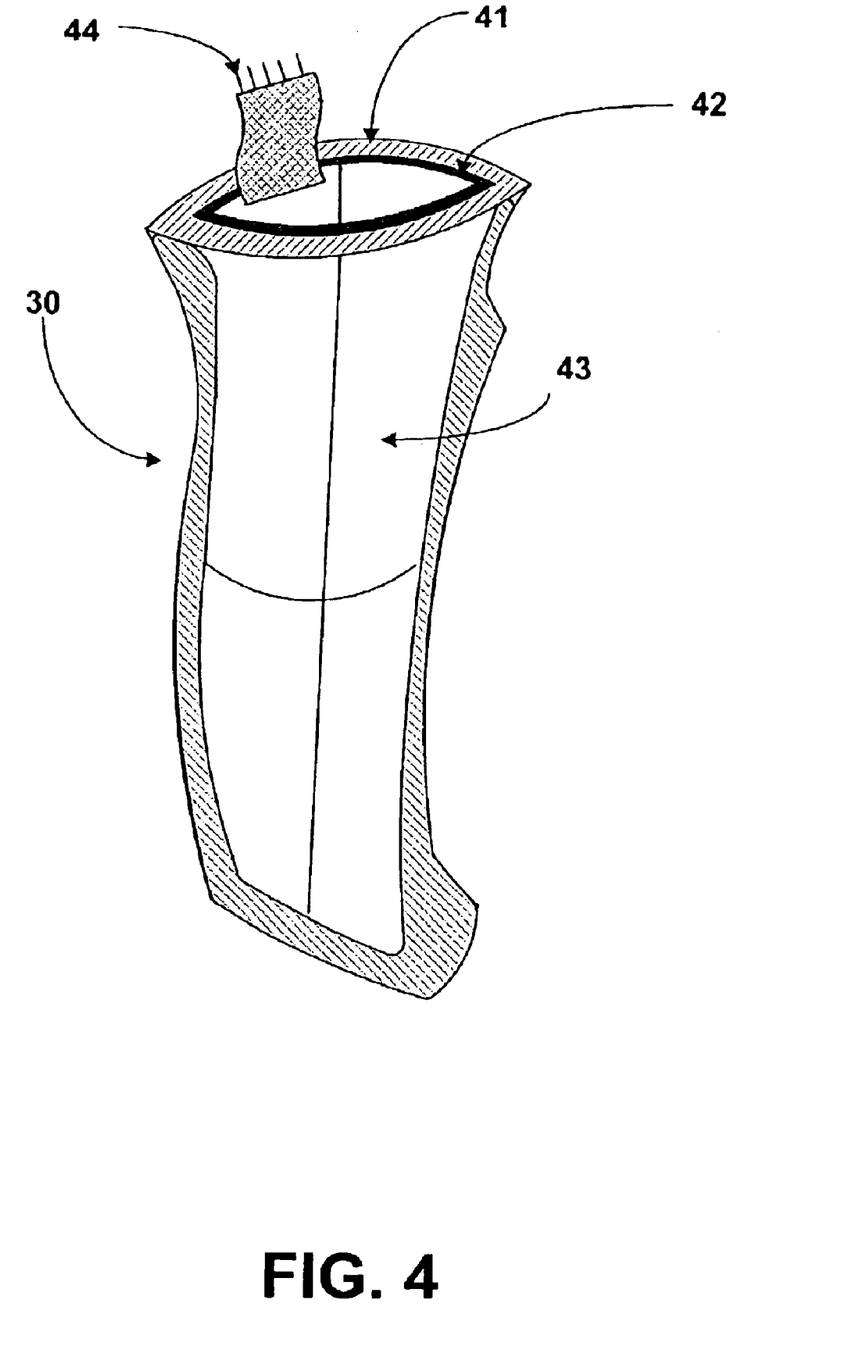
FIG. 4 shows an exemplary embodiment of an integrated battery embedded in the handle of a mobile device.

The exemplary embodiment of the present invention substantially eliminates dead or partially underutilized space that exists in conventional mobile devices. Referring to FIG. 4, the components of the battery 43 and the handle 30 are combined to utilize space more efficiently without sacrificing a user's comfort. Specifically, the battery 43 is built with an outer surface of cells thereof formed in a shape substantially corresponding to an ergonomic shape of the handle 30. This allows the power generating cell of the battery 43 (e.g., anode and cathode) to occupy a larger portion of the volume of the handle 30. The shape of the handle 30 may be created using a molding process whereby the handle 30 is molded around the ergonomically shaped cells of the battery 43. This approach is different than the conventional approach where the handle is formed with a cavity or cavities specifically designed to accommodate batteries of a predetermined shape. In contrast, a battery according to the present invention is adopted to the shape of the handle with active cell elements thereof filling the space within the handle to substantially eliminate dead space. This allows the battery to hold more charge and last longer.

FIG. 4 shows an exemplary embodiment of a battery 43 integrated into a device handle 30. A first one of the active portions of the battery 43 (e.g., anode and cathode) forms an inner portion of the handle 30. Another surface of the battery 43 is preferably covered successively with a protective layer 41 and a plastic molding 42 which form together a gripping surface of the handle 30.

A connector 44 is located on top of the battery 43 and connects the battery to the circuitry of the unit 200. Those of skill in the art will understand that the connector 44 may, for example, comprise a gold plated printed circuit board connector, flexible or solid leads/wires, etc. In addition to connecting the battery 43 to the circuitry of unit 200 for the purpose of data communications, the connector 44 may also be used to connect the battery 43 to an energy source (i.e., power) to recharge the battery 43. Those skilled in the art will also understand that, in addition to the connector 44, there may be additional electrical and mechanical fasteners (e.g., clips, slots, etc.) to attach the handle 30 firmly to a unit 200.

Figure 5:
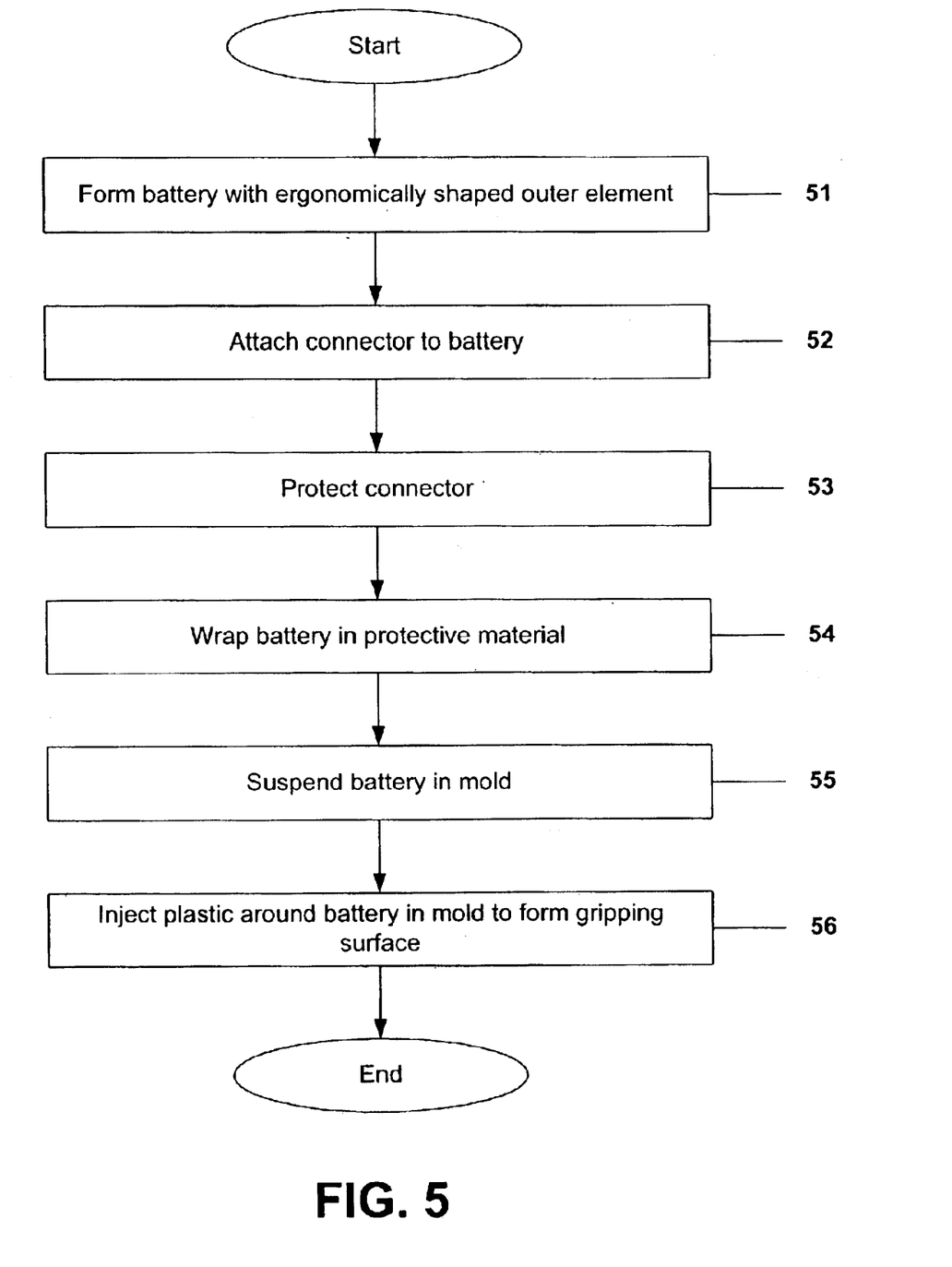
FIG. 5 is a flow chart showing an exemplary embodiment of a method according to the present invention.

FIG. 5 shows an exemplary embodiment of a method according to the present invention. In the step 51, the battery 43 is formed from active components (e.g., anode or cathode) into the desired ergonomic shape. For example, a first one of an anode and a cathode is formed in a shape substantially conforming to an outer shape of a storage portion of the unit 200 within which the battery 43 is to be stored (e.g., the handle 30). In the step 52, the connector 44 is attached to the battery 43.

In the step 53, the connector 44 is protected from the possible damage occurring (e.g., during subsequent steps). As would be understood by those of skill in the art, the connector 44 may be enclosed in a shell which may consist of a heat-resistant material strong enough to withstand a contact with a molten liquid (e.g., plastic). In an alternative exemplary embodiment, the connector 44 may be protected by a shape of the mold so that the molten liquid cannot reach the connector 44. As would be further understood by those skilled in the art, the shell may be formed so that it is easily removable at the end of the manufacturing process.

In the step 54, the battery 43 is wrapped in a layer of a protective material (e.g., shrink-wrapped) to form the protective layer 41. For example, the first one of the anode and the cathode is coated with a protective material to create a battery pack. As those skilled in the art will understand, the protective material may be plastic (e.g., polyurethane, polyethylene, etc.) which is shrink-wrapped onto the battery, metal (e.g., aluminum; tin, stamp sheet metal, etc.) or any other material used in conventional battery design. In the exemplary embodiment, the protective layer 41 may, for example, be heat-resistant in order to protect the battery from excessive heat generated during the step 56 as described below.

In the step 55, the battery is suspended in a mold which is formed in an ergonomic shape corresponding to that of the other surface of the battery 43. For instance, the battery may be suspended in a mold having a shape substantially corresponding to the desired shape of the first one of the anode and the cathode. The shape of the mold may be formed, for example, in the desired shape of the gripping surface of the handle including any other additional pieces that may be coupled thereto). For example, the additional pieces may have either an aesthetic or a functional purpose, e.g., a belt clip, a hole for a metal ring, etc.

Furthermore, steps may be taken to prevent the protective shell used in the step 53 from being covered by the plastic molding 42. As would be understood by those skilled those skilled in the art, this may be accomplished by, for example, keeping a top portion of the battery 43 outside the mold or by forming the mold to prevent injection around the area of the connector 44.

In the step 56, molten plastic is injected around the battery 43. During this process, the shrink-wrap 41 coating the battery 43 protects the battery 43 from potentially damaging excessive heat. The plastic is then cooled to form the plastic molding 42 around the battery 43.

Figure 6A:
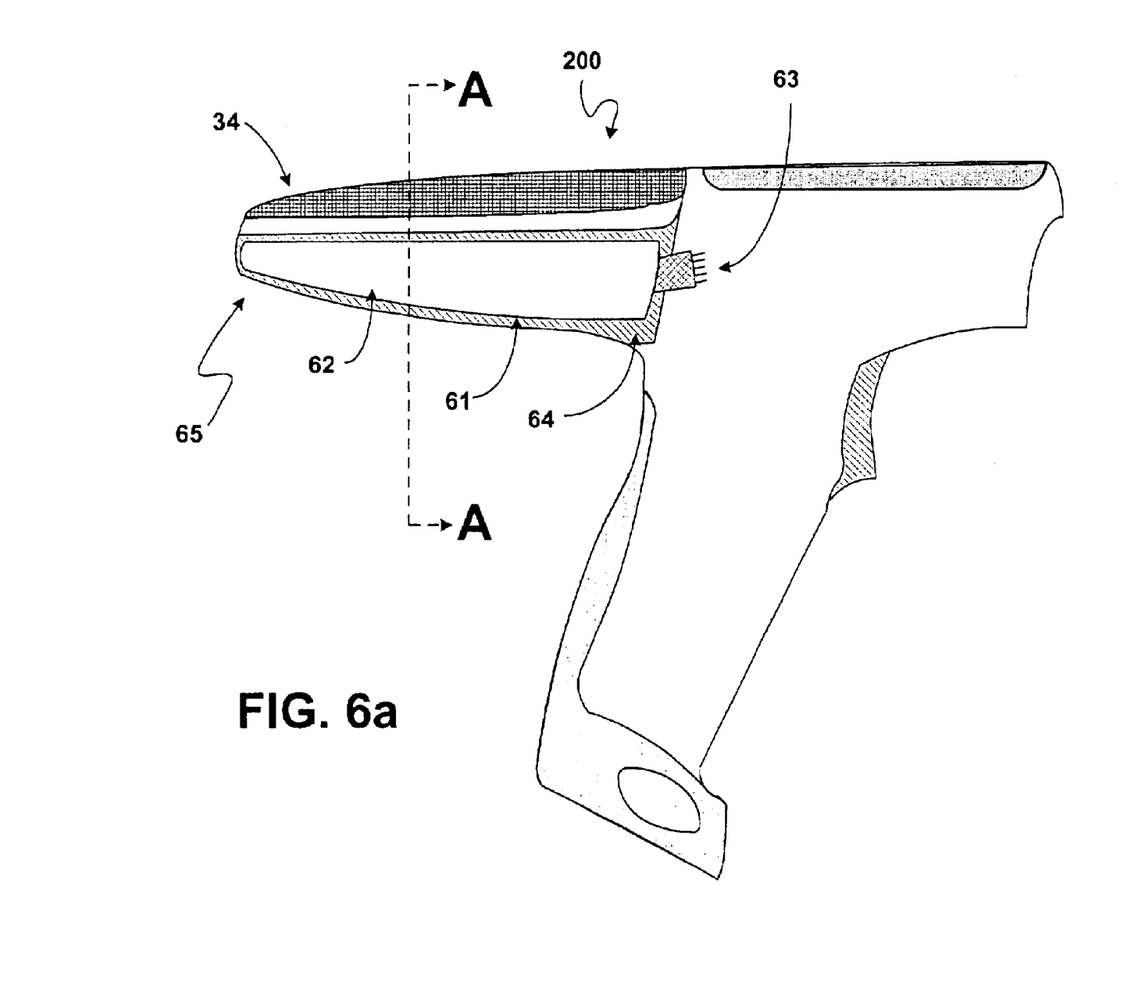
FIG. 6*a* shows an exemplary embodiment of a battery embedded in a back portion of a mobile device.
Figure 6B:
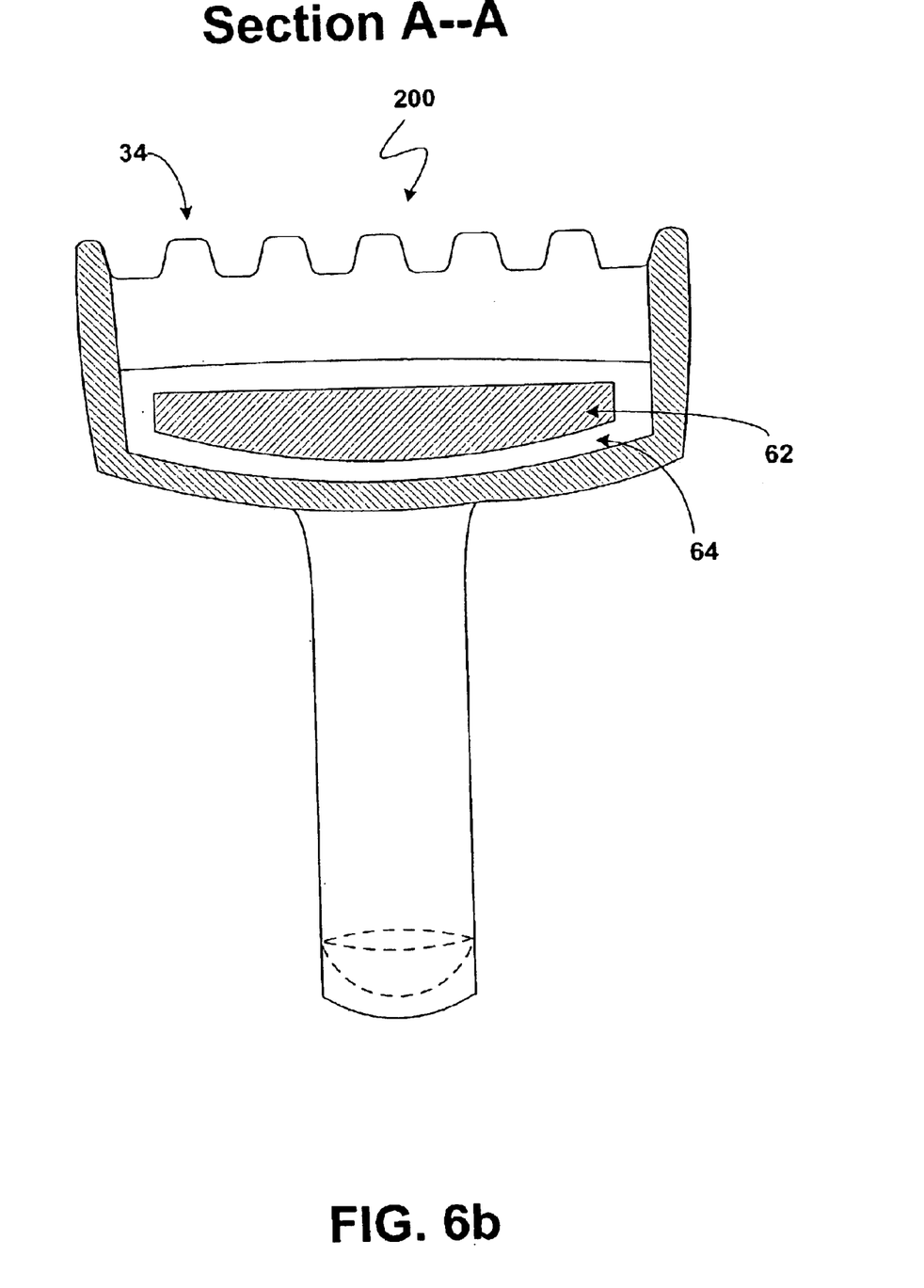
FIG. 6*b* shows section view at the back portion illustrated in FIG. 6*a*.

The present invention is not limited to embedding a battery 43 inside of the handle 30. The battery 20 may be integrated in any location of the unit 100 where there is a significant amount of unused, dead or underutilized space. FIGS. 6a and 6b show a battery 62 included in a back portion 65 of a unit 200.

The back portion 65 may be substantially similar in construction and manufacture of the handle 30 except for the shape, which will be dictated by considerations of function, ergonomics, etc., as will be understood by those of skill in the art. In particular, the battery 62 is covered with shrink-wrap 61 and then enclosed in a plastic molding 64 as described above. However, the shape of the outer active element of the battery 62 will now be formed to correspond to the desired shape of the back portion 65. The connector 63 extends from a front of the battery 62 and connects it to the unit 200. In this embodiment, for example, a keypad 34 may be positioned on top of the battery 62.

Figure 7:
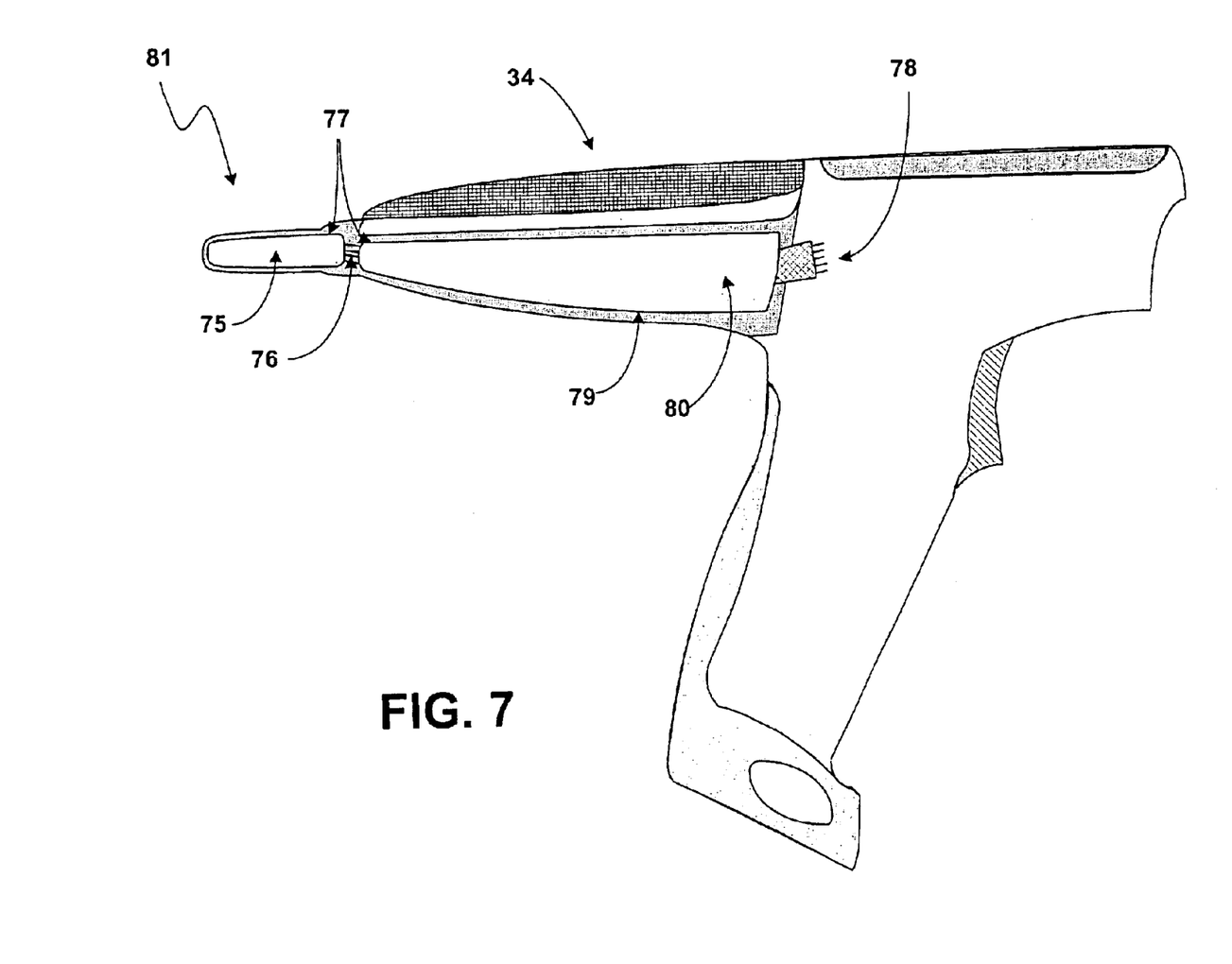
FIG. 7 shows an exemplary embodiment of a battery with a peripheral embedded in a back portion of the device shown in FIG. 3.

As shown in FIG. 7, the present invention allows a battery 80 to be integrated into a back portion 81 of a unit 200 similar to the arrangement in FIGS. 6a and 6b, except that the back portion 81 of the embodiment may also include a magnetic reader 75 or other peripheral. For example, the reader 75 may be replaced by any number of peripherals that may be included or offered with similar units 200. For example, if the unit 200 is a scanner, then the reader 75 may be replaced by another peripheral such as a data storage peripheral, a signature capture, print reader, G.P.S., stand alone walkie-talkie, smart card reader, etc. As would be understood by those skilled in the art, the reader 75 may be used for credit card transactions and operates by scanning magnetic strips located on the credit cards.

The back portion 81 may be substantially similar in construction and manufacture to the handle 30. For example, during the step 53, the reader 75 may be attached to the battery and protected similarly to the connector 78 as described above in regard to FIGS. 1–5. A second connector 76 extends from the rear of the battery 80 and connects the battery to the circuitry of the reader 75. The battery 80 and the reader 75 are then covered with a shrink-wrap 77 and are enclosed in a plastic molding 79, as described above. The first connector 78 extends from the front of the battery 80 and connects the battery to the circuitry of the unit 200. In this embodiment, a keypad 34 is positioned on top of the battery 80. The back portion 81 may also be manufactured such that it includes the connector 76 without an attached peripheral. In such a case, a user of the device may attach any desired peripheral to the connector 76. Those skilled in the art would understand that the reader 75 and the battery 80 may be two separate stand along parts which are easily attached.

The forming of batteries to conform to a desired outer shape of a portion of the device storing the battery allows the incorporation into unit 200 of a larger battery 43 and allows a battery to be integrated into portions of units 200 where previously there had been significant dead space.

In an alternative embodiment, a mobile device may incorporate both the integrated handle battery shown in FIG. 4 and the back portion battery shown in FIGS. 6a and 6b. This may eliminate a substantial portion of the dead space in the unit and reallocate this space for battery power, so that, for example, one of the battery units may act as a backup power pack significantly extending the single charge life of the device. Thus the need for a traditional backup battery may be eliminated.

Figure 8A:
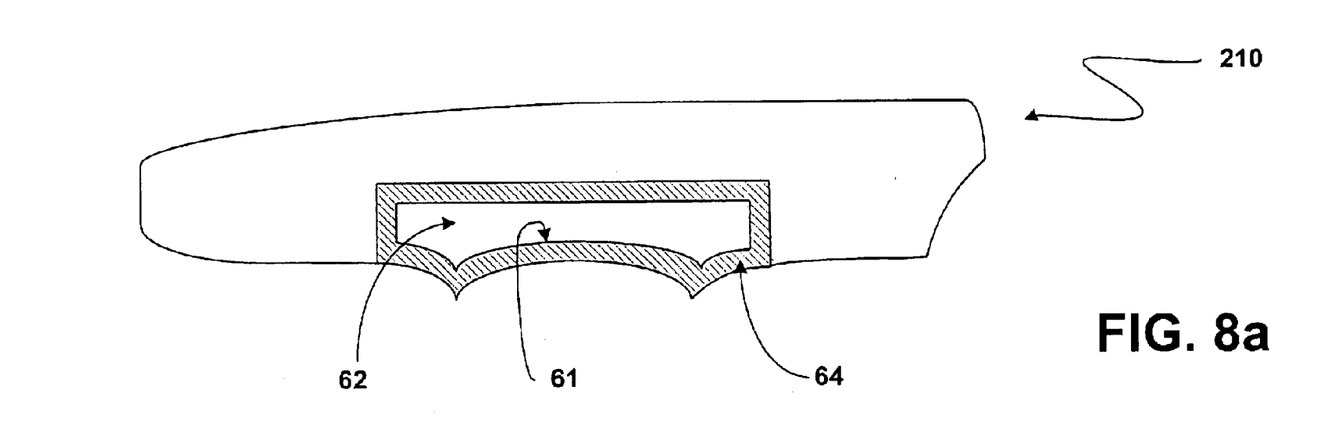
FIGS. 8*a* and 8*b* show an alternative exemplary embodiment of mobile devices with an integrated battery according to the present invention.
Figure 8B:
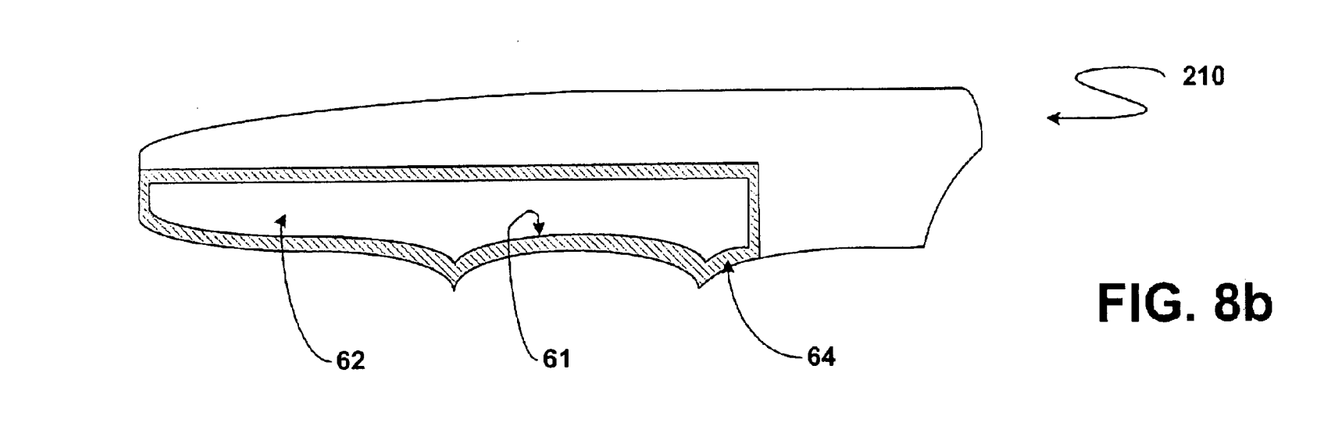

As mentioned above, those skilled in the art would understand that the battery may incorporate in other portions of the mobile device. In particular, a designer of the mobile device may determine a particular portion of the mobile device which is not being utilized completely or underutilized. Then, the designer may design a battery of corresponding shape and form that would fit into this portion. For example, FIGS. 8a and 8b shows exemplary alternative embodiments of the mobile device 210 having battery 62. In FIG. 8a, the battery 62 is situated is a handle insertion portion of the mobile device 210. This allows the mobile device 210 to have a proper balance. In FIG. 8b, the battery 62 is larger and the balance is tilted towards the back portion of the mobile device 210.

There are many modifications to the present invention which will be apparent to those skilled in the art without departing form the teaching of the present invention. The embodiments disclosed herein are for illustrative purposes only and are not intended to describe the bounds of the present invention which is to be limited only by the scope of the claims appended hereto. For instance, the present invention may be also applicable to mobile device that utilize a portable battery but do not have a handle. The battery may situated in such mobile devices as well. In particular, the battery may situated in those portions of the mobile deice which are partially or complete unutilized.

What is claimed is:

1. A method for manufacturing a battery for a mobile unit, comprising the steps of:
    forming a first one of an anode and a cathode in a shape substantially conforming to an outer shape of a storage portion of the mobile unit within which the battery is to be stored;
    coupling a connector to the battery for connecting the battery to circuitry of the mobile unit;
    coating the first one of the anode and the cathode with a protective material to create a battery pack;
    suspending the battery pack into a mold having a shape substantially corresponding to a first one of the anode and the cathode;
    injecting a liquid covering material into the mold to cover at least a portion of the battery pack; and
    cooling the covering material to form an outer surface of the storage portion of the mobile units, while preventing the covering material and the protective material from covering the connector.

2. The method according to claim 1, wherein the mobile unit is a handheld bar code scanner.

3. The method according to claim 1, wherein the protective material is a heat-resistant shrink-wrap material.

4. The method according to claim 1, further comprising the step of:
    covering the connector with a removable, protective material to protect the connector from the protective and covering materials.

5. The method according to claim 1, wherein the shape of the mold is such that the connector is protected from coming into contact with at least one of the protective and preventive materials.

6. The method according to claim 1, wherein the protective material is a metal.

7. The method according to claim 1, wherein the covering material is plastic.

8. The method according to claim 1, wherein the storage portion of the mobile unit is an ergonomically formed handle and wherein the first one of the anode and the cathode is formed in a shape substantially following the ergonomic shape of the handle.

9. The method according to claim 1, wherein the storage portion is a back portion of the mobile unit on which a keypad is mounted.

10. The method according to claim 1, further comprising the step of:
    before the coating step, attaching a further device to the battery so that when the battery is mounted to the mobile unit, the further device is also coupled thereto.

11. The method according to claim 10, wherein the further device is at least one of a credit card reader, a smart card reader, a G.P.S. and a fingerprint reader.

12. The method according to claim 1, wherein the connector carries at least one of power and data signals.

13. The method according to claim 1, further comprising the step of:
    determining the storage portion of the mobile device as a function of a space utilization of by the mobile device.

14. The method according to claim 1, wherein the mobile device is a mobile handleless device.

15. A battery holding portion of a mobile unit, comprising:
    a battery having one of an anode and a cathode formed in a shape corresponding to a shape of an outer surface of the battery holding portion;
    a connector connecting the battery to the circuitry of the mobile unit;
    a protective material coating a portion of the first one of the anode and the cathode; and
    a covering material coating the protective material to form at least a partial outer surface of the battery holding portion.

16. The battery portion of claim 15, wherein the battery holding portion is an ergonomically shaped handle.

17. The battery holding portion of claim 15, further comprising: a second connector for coupling a peripheral device to the mobile unit.

18. The battery holding portion of claim 17, further comprising: a peripheral integrally formed with the battery.

19. The battery holding portion of claim 15, wherein the connector carries at least one of power and data signals.

20. The battery holding portion of claim 15, wherein the battery holding portion is at least partially underutilized portion of the mobile device.

* * * * *